(12) United States Patent
Kwon et al.

(10) Patent No.: US 7,900,018 B2
(45) Date of Patent: Mar. 1, 2011

(54) EMBEDDED SYSTEM AND PAGE RELOCATION METHOD THEREFOR

(75) Inventors: Young-Su Kwon, Daejon (KR); Bon-Tae Koo, Daejon (KR); Nak-Woong Eum, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 733 days.

(21) Appl. No.: 11/949,879

(22) Filed: Dec. 4, 2007

(65) Prior Publication Data

US 2008/0133876 A1 Jun. 5, 2008

(30) Foreign Application Priority Data

Dec. 5, 2006 (KR) .................. 10-2006-0122489
Oct. 23, 2007 (KR) .................. 10-2007-0106829

(51) Int. Cl.
*G06F 12/00* (2006.01)
(52) U.S. Cl. ...... 711/209; 711/5; 711/156; 711/E12.014; 711/E12.069
(58) Field of Classification Search .................. 711/209, 711/5, 156, 103, E12.014, E12.016, E12.059; 713/300; 365/226, 230.03
See application file for complete search history.

(56) References Cited

U.S. PATENT DOCUMENTS

| | | | | |
|---|---|---|---|---|
| 6,141,283 A | * | 10/2000 | Bogin et al. | 365/226 |
| 6,233,195 B1 | * | 5/2001 | Yamazaki et al. | 365/230.03 |
| 6,552,949 B1 | | 4/2003 | Silla et al. | |
| 6,917,555 B2 | | 7/2005 | Bedwell et al. | |
| 2006/0041769 A1 | | 2/2006 | Hu et al. | |
| 2006/0195707 A1 | * | 8/2006 | Rychlik | 713/300 |
| 2008/0313482 A1 | * | 12/2008 | Karlapalem et al. | 711/173 |

FOREIGN PATENT DOCUMENTS

| | | |
|---|---|---|
| JP | 2005-196343 A | 7/2005 |
| KR | 1020020061364 A | 7/2002 |
| KR | 1020040044420 A | 5/2004 |

OTHER PUBLICATIONS

Mahmut Kandemir, et al.; "Compiler-Guided Leakage Optimization for Banked Scratch-Pad Memories;" IEEE Transactions on Very Large Scale Integration (VLSI) Systems, vol. 13, No. 10, pp. 1136-1146, Oct. 2005.

* cited by examiner

*Primary Examiner* — Pierre-Michel Bataille
(74) *Attorney, Agent, or Firm* — Ladas & Parry LLP

(57) ABSTRACT

Provided are an embedded system and a method for relocating memory pages therefor. The embedded system includes a processor, a data relocating circuit for receiving a logical address from the processor, mapping the received logical address to a physical address to locate a valid page in a predetermined bank, and generating a bank power control signal according to whether or not a corresponding memory bank includes valid pages, and a memory including a plurality of memory banks addressed by a physical address outputted from the data relocating circuit and a plurality of switching means for selectively supplying a power voltage to each of memory banks in response to the bank power control signal.

6 Claims, 3 Drawing Sheets

FIG. 3

| Logical page address /201 | Mapped physical bank /202 | Page in the physical bank /203 | valid flag /204 |
|---|---|---|---|
| 0 | 0 | 1 | 1 |
| 1 | X | X | 0 |
| 2 | 1 | 6 | 1 |
| ⋮ | ⋮ | ⋮ | ⋮ |
| 63 | X | X | 0 |

EMBEDDED SYSTEM AND PAGE RELOCATION METHOD THEREFOR

CROSS-REFERENCES TO RELATED APPLICATIONS

The present invention claims priority of Korean Patent Application Nos. 10-2006-0122489 and 10-2007-0106829, filed on Dec. 5, 2006, and Oct. 23, 2007, respectively, which are incorporated herein by reference.

BACKGROUND OF THE INVENTION

1. Field of the Invention

The present invention relates to a semiconductor design technology and, more particularly, to an embedded system having a processor and a memory and a method for relocating memory pages in the embedded system.

This work was supported by the Information Technology (IT) research and development program of the Korean Ministry of Information and Communication (MIC) and/or the Korean Institute for Information Technology Advancement (IITA) [2006-S-048-01, "embedded DSP platform for processing audio and video signal"].

2. Description of Related Art

The development of an information technology (IT) makes portable devices popular. Various types of portable devices have been commonly used in daily life, lately. Since the portable devices are driven by batteries, there have been many researches in progress for extending an operation time of a portable device with a limited battery capacity. In order to extend the operation time, a technology for minimizing power consumption of semiconductor chips in a portable device was introduced. The technology became a factor to decide the productivity of the portable device.

The power consumption of a semiconductor chip may be divided into two factors, dynamic power consumption and leakage power. The dynamic power consumption denotes electric power consumed by a transistor in a semiconductor and a capacitor component in a metal line. The capacitor component is filled up with charge and emptied repeatedly at every clock cycle. Since the flow of charge is current, it is the major factor of the power consumption. Meanwhile, further the semiconductor manufacturing process is advanced, more the leakage power occurs. That is, a gate oxide thickness becomes thinner as the semiconductor manufacturing process is advanced. Since thin gate oxide cannot stand high voltage, it is required to lower the operating voltage of a semiconductor circuit. The lowered operating voltage becomes closer to a threshold voltage and thus a transistor is not completely turned off or on. As a result, the amount of current (sub-threshold current) abruptly increases generated under the threshold voltage.

In order to reduce the dynamic power consumption, a method for interrupting the clock of a processor, a method for reducing the number of gates, and a method for reducing the number of signal transitions in a circuit were introduced. However, these methods cannot reduce the leakage current. The most effective method for interrupting the leakage current is to cut off the power of a circuit.

If the power of a circuit is cut off, the circuit does absolutely not operate. In case of a Flip-flop or a memory, memorized data is lost if the power is cut off. The power cut off method may be acceptable if an entire embedded system operates in a power down mode. However, it is very rare to operate the entire embedded system in the power down mode. Therefore, a method for cutting off power of a predetermined part was introduced. As a method for cutting off power in a transistor level, a variable threshold circuit, a dual-threshold transistor, a multi-threshold transistor, and a power gating structure were introduced.

In order to effectively cut off the leakage current, it is more effective to use a method for dynamically controlling power of circuit divisions in a system rather than using of a new designed transistor circuit. Particularly, the number of gates of a memory occupies much more weight than the number of logic gates because the large capacity memory is integrated in a multimedia based embedded system. Therefore, the reduction of leakage current generated in a memory critically influences to the reduction of overall power consumption.

SUMMARY OF THE INVENTION

An embodiment of the present invention is directed to providing an embedded system for minimizing leakage current generated in a memory and a method for relocating pages therefor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an embedded system including: a processor; a data relocating circuit for receiving a logical address from the processor, mapping the received logical address to a physical address to locate a valid page in a predetermined bank, and generating a bank power control signal according to whether or not a corresponding memory bank includes valid pages; and a memory including a plurality of memory banks addressed by a physical address outputted from the data relocating circuit and a plurality of switching means for selectively supplying a power voltage to each of memory banks in response to the bank power control signal.

The data relocating circuit may include a page locator for generating a physical page address, a page translator for receiving the logical page address from the page locator, and outputting a physical page address corresponding to the logical page address or a newly mapped physical page address, a page valid flag unit for allocating a valid flag of each page according to page information transferred from the processor, and a power controller for generating the bank power control signal with reference to the page translator and the page valid flag unit.

In accordance with another aspect of the present invention, there is provided a method for relocating a page for an embedded system having a processor and a memory, including the steps of: confirming whether a logical page requested by the processor is valid or not; finding a bank having most valid pages and at least one of invalid pages if a corresponding page is invalid; writing an invalid page number at a physical page number entry; setting a valid flag corresponding to an invalid page as an on-state; and outputting a result page number.

The method may further include, after the confirming whether a logical page requested by the process is valid or not, the step of outputting a physical page address corresponding a logical page address if the requested logical page is valid.

The development of a deep-submicron semiconductor technology enables to form gate oxide thinner than 90 nm. Therefore, a leakage current that is generated at below a threshold voltage is equivalent to almost of all power consumption of entire system. Particularly, the leakage current of a memory area is a critical part of overall power consumption because the number of gates in a memory abruptly increases compared to the number of all gates in an embedded system having a processor and a memory. In the present invention, a memory is divided into a plurality of memory banks, and a circuit for cutting off the leakage current of each memory banks is included. Then, the power consumption is reduced by dynamically cutting off the leakage current of memory banks that are not in use while the system is operating. Particularly, a leakage current is dynamically controlled by relocating data used by a processor using a data relocating circuit.

In the present embodiment, a memory is divided into a plurality of physical memory banks. In a view of a processor, a memory is divided into a plurality of logical memory pages, and a data relocating circuit decides a memory bank where each of memory pages is physically located. The processor accesses a physical memory bank with reference to a data relocating circuit when the processor reads data from the memory. Initially, all memory banks are inactivated (turn-off) to remove the leakage current. If a processor requests to store data in a memory, the data relocating circuit activates (turn-on) a corresponding memory bank. The processor requests memory bank invalidation when all memory pages in the memory bank are not valid any more. If the memory bank is invalidated by the processor, all memory pages in the memory bank are invalidated. The inactivated memory bank is cut off with power, thereby reducing leakage current. The data relocating circuit according to the present invention maximizes the number of memory banks with the power cut off while the processor is operating, thereby minimizing the leakage current.

BRIEF DESCRIPTION OF THE DRAWINGS

FIG. 3 is a diagram for describing a page translator and a page valid flag unit in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
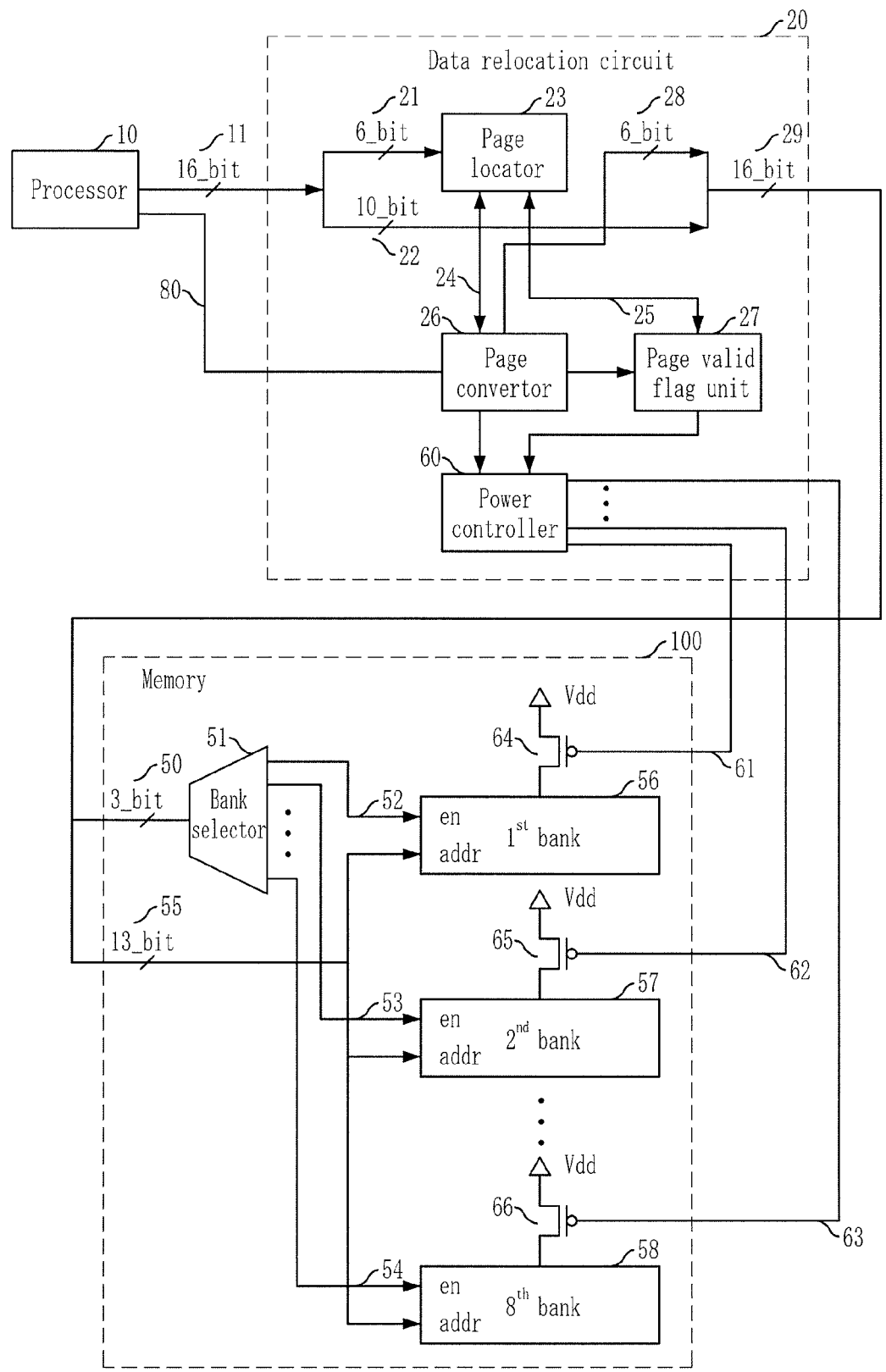
FIG. 1 is a block diagram illustrating an embedded system in accordance with an embodiment of the present invention.

FIG. 1 is a block diagram illustrating an embedded system in accordance with an embodiment of the present invention.

Referring to FIG. 1, the embedded system according to the present embodiment includes a processor 10, a data relocating circuit 20, and a memory 100.

The processor 10, for example, a digital signal processor (DSP) Core, performs a read operation or a write operation to read or write data on the memory at every clock cycle. Particularly, a digital signaling processor (DSP) simultaneously performs a plurality of read and write operations to read or write server data at every clock cycles. As shown in FIG. 1, the embedded system 10 according to the present embodiment outputs 16-bits of a logical memory address 11. The logical memory address 11 inputs to the data relocating circuit 20.

The data relocating circuit 20 converts the logical memory address 11 to a physical memory address 29. The logical memory address 11 is an address in a view of a program performed in the processor 10. On the contrary, the physical memory address 29 is an address for accessing an actual memory. The logical memory address 11 is divided into a page address 21 and an offset address 22. In order to manage a memory, an entire memory is divided by a predetermined unit. Each of divided areas is referred as a page. In FIG. 1, a 16-bit memory address area includes 64 pages because the page address 21 is 6-bit. Also, the memory 100 is divided into a plurality of memory banks 56, 57, . . . , 58. In the present invention, the memory 100 includes eight memory banks as shown in FIG. 1. Therefore, one of memory banks has a 13-bit physical offset address 22. Also, one of memory banks includes 8 physical pages.

In the data relocating circuit 20, the page locator 23 generates the physical page address 28 with reference to the page translator 26 and the page valid flag unit 27.

Figure 2:
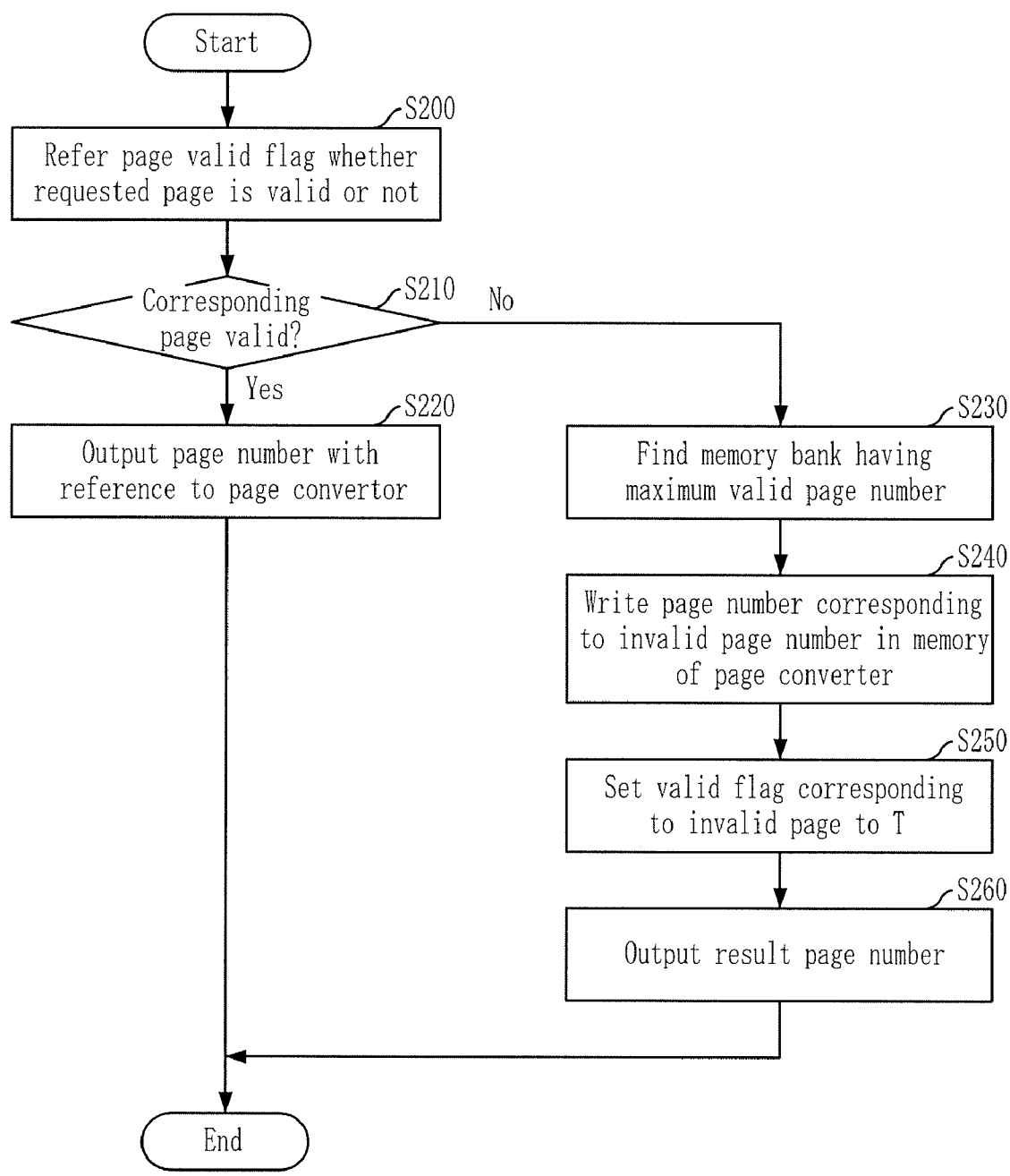
FIG. 2 is a flowchart of a page relocation method of a page locator in accordance with an embodiment of the present invention.

FIG. 2 is a flowchart of a page relocation method for a page locator in accordance with an embodiment of the present invention.

Referring to FIG. 2, the page locator 23 determines whether a corresponding page is valid or not with reference to the page valid flag unit 27 through a bus 25 when the page locator 23 receives a logical page address 21 at step S200. The valid page means that the current memory bank includes a physical memory area having a corresponding logical page.

It is determined whether the corresponding logical page is valid or not at step S210. If the corresponding logical page is valid at step S210, the page locator 23 outputs a logical page address 24 to the page translator 26. The page translator 26 stores a physical page address 28 corresponding to a requested logical page address 21 in a page transform entry, and the page locator 23 outputs a physical page address 28 corresponding to a logical page address 24 at step S220.

Meanwhile, if a logical page is invalid at the step S 210, the page locator 23 maps a new physical page address to a corresponding logical page address 21 with reference to the page translator 26 at steps S230 S240, S250, and S260.

Hereinafter, the steps for mapping a new physical page address to a corresponding logical page address 21 with reference to the page translator 26 will be described.

The number of currently valid physical pages in each of the memory banks can be calculated with reference to the page translator 26. $B_i$ denotes an $i^{th}$ memory bank, and $P_{ij}(B_i)$ denotes a $j^{th}$ physical page in the $i^{th}$ memory bank. $|P_{ij}(B_i)|$ denotes the number of valid physical pages in the $i^{th}$ memory bank $B_i$. The page locator 23 finds a memory bank I having the maximum $|P_{ij}(B_i)|$ and more than one invalid physical page and also finds a page J among invalid physical pages in $B_i$. That is, the page locator 23 finds invalid pages in a memory bank having the maximum number of valid pages.

The page locator 23 stores a page J into an entry of the page translator 24 corresponding to a logical page address 21 at step S240.

Also, the page locator 23 allocates the valid flag of the page J of the page valid flag unit 27 to '1' and outputs a result page address through the page translator 26 at step S260.

The physical page address 28 outputted from the page translator 26 is concatenated with an offset address 22 except a page address 21 among the logical address 11 outputted form the processor 10, thereby generating a physical memory address 29.

The physical address 29 transformed by the data relocating circuit 20 is inputted to the memory 100. The memory 100 is divided into a plurality of memory banks 56, 57, . . . , 58. A part of upper most bits among the bits of the physical memory address 29 are a bank selection address 50, and the remaining bits are a physical offset address 55. In case of FIG. 1, the bank selection address 50 is 3-bits and the physical offset address 55 is 13-bits. The bank selection address 50 is decoded to a bank selection signal (Bank enable) 52, 52, . . . , 54 by the bank selector 51. Only one of the selection signals 52, 53, . . . , 54 of each bank is activated at every clock cycle. The physical offset addresses 55 inputs to all of the memory banks 56, 57, . . . , 58. A memory bank 56, 57, . . . , 58 selected by the bank selection signal 52, 53, . . . , 54 stores or outputs data requested by the processor 10.

The power controller 60 in the data relocating circuit 20 outputs a memory bank power control signal 61, 62, . . . , 63.

If each of the memory banks 56, 57, . . . , 58 includes at least one of valid logical page, the power controller 60 allocates the memory bank power control signals 61, 62, . . . , 63 of a corresponding memory bank as '0' with reference to the page translator 26 and the page valid flag unit 27. If the memory bank power control signal 61, 62, . . . , 63 becomes '0', the power control transistor 64, 65, . . . , 66 is turned on, thereby supplying power to a corresponding memory bank. If each of memory banks does not include valid logical pages, the power controller 60 allocates the power control signals of a corresponding memory bank as '1'. If the memory bank power control signal becomes '1', the power control transistors 64, 65, . . . , 66 are turned off, thereby cutting off the power of a corresponding memory bank. That is, the leakage current is cut off.

The processor 10 makes a corresponding logical page invalid by outputting a page invalidating signal 80 to the page valid flag unit 27 if a predetermined logical page is not necessary anymore while a program is operating. As described above, the power is supplied to only necessary physical pages for operating a current process by making a valid flat thereof '1'.

Meanwhile, if the processor 10 transits to a power down mode, the power controller 60 cuts off the power of all memory banks 56, 57, . . . , 58 because all memory banks 56, 57, . . . , 58 are necessary for a related process.

FIG. 3 is a diagram for describing a page translator and a page valid flag unit in accordance with an embodiment of the present invention.

Referring to FIG. 3, entries are disposed in a row. An address indicating each entry becomes a logical page address 201. An entry indicated by the logical page address 201 includes a physical memory bank number 202 and a page number of each page in the physical memory bank, which are mapped to each entry. The page valid flag unit 27 includes valid flags 204 for corresponding entries. Entries having a valid flag 204 of '1' indicate pages that are currently necessary to the processor 10.

In an embedded system including a typical processor 10 and a memory 100 without a data relocating circuit 20, the logical memory address 11 has the same value of the physical memory address 29. While a predetermined program is executing, necessary memories are distributed and the distributed necessary memories are included in a plurality of memory banks. Therefore, it is necessary to supply power to all of memory banks 56, 57, . . . , 58 in order to normally operate the predetermined program. A memory bank that receives the power while the processor 10 is operating generates leakage current regardless of the necessity of data.

In the present embodiment, the data relocating circuit 20 maps a logical memory page to a physical memory page when the processor 10 requests a memory page. Since the data relocating circuit 20 locates a corresponding logical memory page in one of physical memory banks 56, 57, . . . , 58 which currently include the most logical memory pages, a set of logical memory pages necessary for executing a current program is mostly located in the same memory bank. The page locating algorithm shown in FIG. 2 makes the number of physical memory banks having necessary data minimum. That is, logical memory pages recognized by the processor 10 are distributed through entire memory area due to the absence of rule. On the contrary, the logical memory pages are located at the minimum physical memory banks, thereby minimizing the number of memory banks to supply power. If the number of memory banks having valid data becomes minimum, the number of memory banks having no memory pages for operating becomes minimum too and the power of the memory banks having no memory page for the operation of the processor is cut off. Therefore, the leakage current is not generated.

While the present invention has been described with respect to certain preferred embodiments, it will be apparent to those skilled in the art that various changes and modifications may be made without departing from the spirits and scope of the invention as defined in the following claims.

As described above, the embedded system using the data relocating circuit according to the present invention cuts off the power of memory banks while the embedded system is operation. Therefore, the leakage current can be minimized.

What is claimed is:

1. An embedded system comprising:
    a processor;
    a data relocating circuit for receiving a logical address from the processor, mapping the received logical address to a physical address to locate a valid page in a predetermined bank, and generating a bank power control signal according to whether or not a corresponding memory bank includes valid pages; and
    a memory including a plurality of memory banks addressed by a physical address outputted from the data relocating circuit and a plurality of switching means for selectively supplying a power voltage to each of memory banks in response to the bank power control signal.

2. The embedded system of claim 1, wherein the predetermined bank has the maximum number of valid pages and at least one of invalid pages.

3. The embedded system of claim 1, wherein the data relocating circuit includes:
    a page locator for generating a physical page address;
    a page translator for receiving the logical page address from the page locator, and outputting a physical page address corresponding to the logical page address or a newly mapped physical page address;
    a page valid flag unit for allocating a valid flag of each page according to page information transferred from the processor; and
    a power controller for generating the bank power control signal with reference to the page translator and the page valid flag unit.

4. The embedded system of claim 1, wherein each of the switching means is connected between each bank and a power voltage end and includes a metal oxide semiconductor (MOS) transistor receiving the bank power control signal as a gate input.

5. A method for relocating a page for an embedded system having a processor and a memory, comprising the steps of:
    confirming whether a logical page requested by the processor is valid or not;
    finding a bank having most valid pages and at least one of invalid pages if a corresponding page is invalid;
    writing an invalid page number at a physical page number entry;
    setting a valid flag corresponding to an invalid page as an on-state; and
    outputting a result page number.

6. The method of claim 5, further comprising, after the confirming whether a logical page requested by the process is valid or not, the step of outputting a physical page address corresponding a logical page address if the requested logical page is valid.

* * * * *